Jan. 19, 1943.  K. E. B. STENBERG  2,308,632
METHOD OF PLASTICIZING HARD PLASTIC MATERIALS
Filed May 8, 1939  3 Sheets-Sheet 3
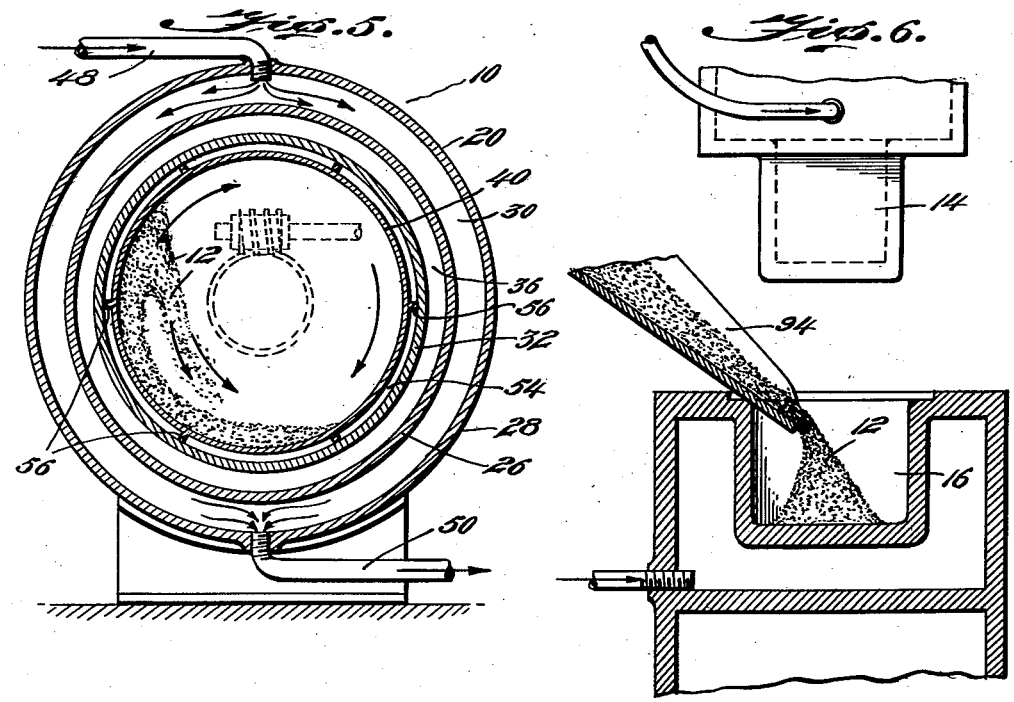
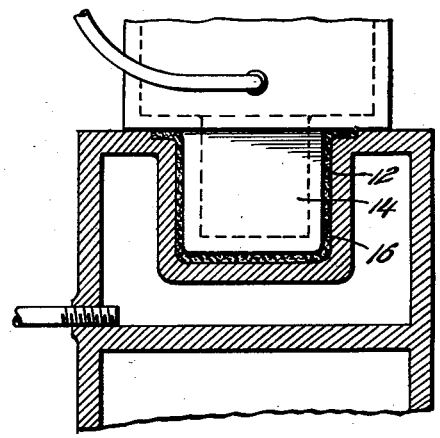
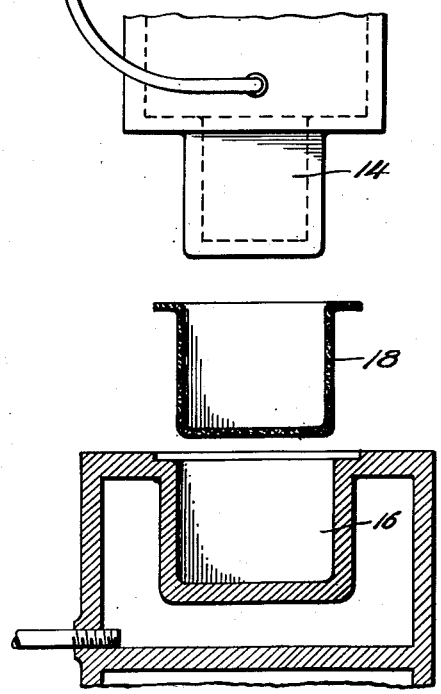
Inventor
Knut E. Birger Stenberg
By Thomas A. Jenckes
Attorney Patented Jan. 19, 1943

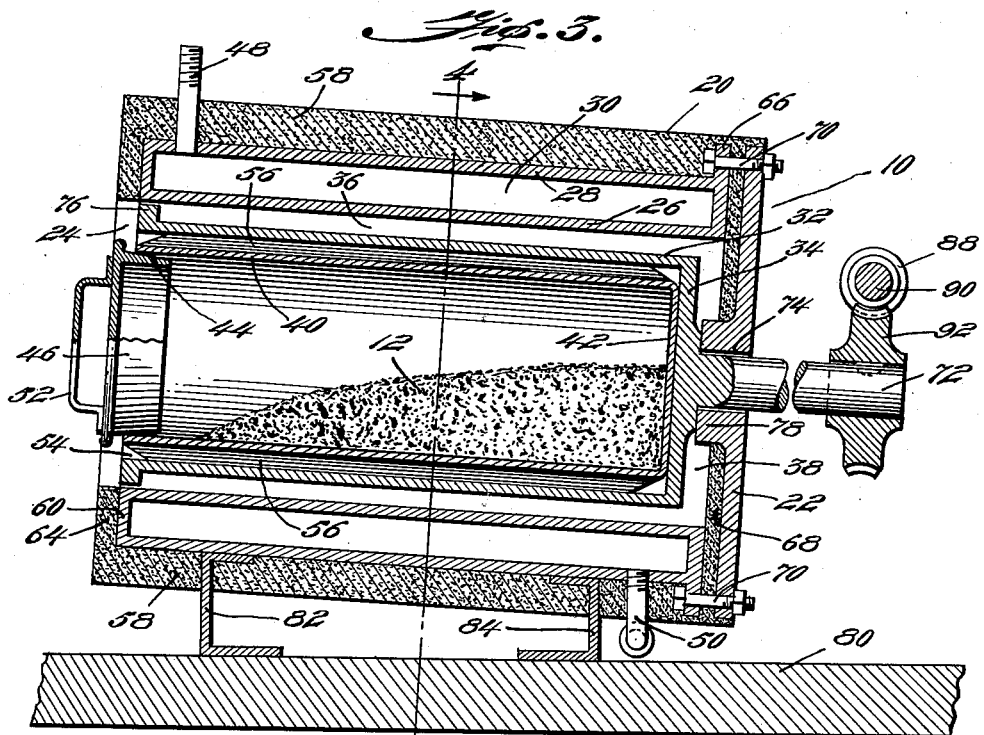
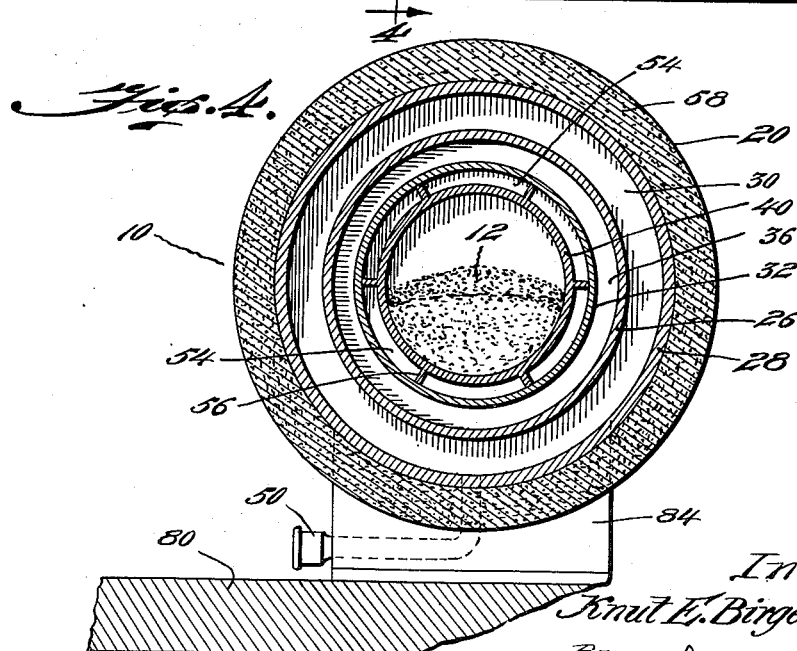

2,308,632

UNITED STATES PATENT OFFICE 2,308,632

METHOD OF PLASTICIZING HARD PLASTIC MATERIALS

Knut E. Birger Stenberg, Attleboro, Mass.

Application May 8, 1939, Serial No. 272,415

2 Claims. (Cl. 18—55)

My invention relates to improvements in molding hard plasticizable materials by compressing a punch within a die under suitable conditions of heat and pressure.

An object of my invention is to preheat said material, preferably while displacing the same in at least two directions by suitable agitation thereof prior to inserting the material, whether it be in powder or pellet form, within the compression mold die.

My invention is particularly adapted for use in molding synthetic materials, such as cellulose derivatives or synthetic resins, preferably of the thermosetting condensation product type.

A further object of my invention is to lessen the time required to close the mold by inserting the material in the mold substantially in a semiplastic condition freed from traces of gas.

I have discovered that a great delay has been caused in the closing of the molds by means of the gases formed in the material in the mold during initial heating thereof, which not only have tended to provide a blistering in the product, but also have caused the material to bubble and flow over the edges of the mold to cause a flash. By the substantial elimination of this ebulition, I am enabled to greatly decrease the time of closing the mold by the abolition of gas and consequent elimination of flash.

A further object of my invention is to cut down mold abrasions due to the fact that prior to insertion in the mold, the material is preferably in semi-plastic form with all abrasive edges eliminated.

A further object of my invention is to provide a quicker reaction in the preheated material during the actual high pressure and high temperature curing or thermoplasticizing of the material in the mold, and thus substantially cut down the time formerly required in curing.

A further object of my invention is to provide a better plasticized article, for inasmuch as I improve the flowing qualities of the material, it is apparent that the homogeneity of the completed article is improved, providing a better job and configuration of the finished article, particularly when mottled materials are employed.

Further features of my invention reside in the inherent construction of the device I preferably employ for preheating the plasticizable material. For this purpose, I provide a heating cylinder rotatable at an angle so as to displace the material contained therein in at least two directions, namely, axially of the rotating cylinder and in a rotative direction at right angles thereto.

A further feature of my improved apparatus is to provide a container unit of small compass mounted on a base, which may be readily moved about the factory, adjacent the desired molds.

A further feature of my invention is to provide a tumbling apparatus of this nature, in which the heating cylinder is insulated from its heating means by radial and axial insulating air spaces.

A further feature of my invention is to provide a tumbler of this description, which is preferably heated in an indirect manner, preferably by indirect steam, so as to more readily control the temperature at which the plasticizable material is preheated.

A further feature of my tumbling apparatus is to provide a heating cylinder which may be readily removed therefrom and provided with a detachable cover.

Further features of my invention relate to the specific details of the tumbling apparatus per se.

These and such other objects of my invention as may hereinafter appear will be best understood from a description of the accompanying drawings, which illustrate an embodiment of the self-contained tumbling unit I preferably employ and diagrammatically illustrate steps in my improved method of molding.

In the drawings, Fig. 1 is a perspective view of the self-contained tumbling unit I preferably employ.

Fig. 3 is a diametric longitudinal sectional view taken through the center of the container.

Fig. 4 is a cross sectional view taken along the line 4—4 thereof.

Figure 1:
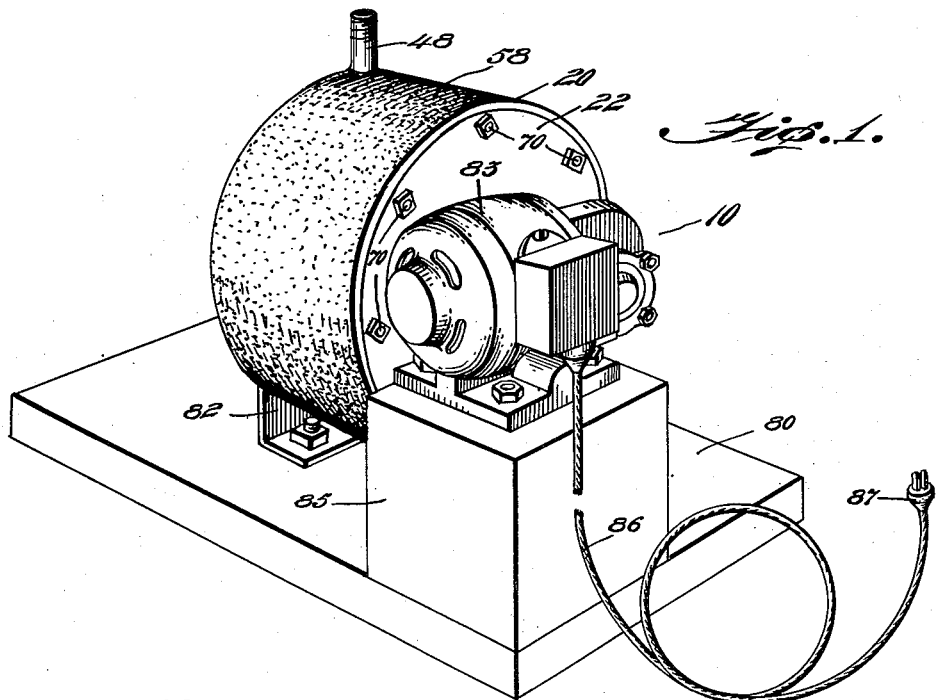

Figs. 5–8 are diagrammatic views illustrating my improved method, Fig. 5 being a diagrammatic cross sectional view of the improved tumbler apparatus, illustrating the step of preheating the plasticizable material in powder form while agitating the same, Fig. 6 being a diagrammatic view showing the mold die in section and the punch in elevation of a suitable mold and illustrating the step of inserting the preheated plasticizable powder within the mold die, Fig. 7 being a view similar to Fig. 6 after the punch has been depressed into the mold die and Fig. 8 being a view after the punch has been raised away from the mold die and the molded article stripped from the mold die.

In the drawings, wherein like characters of reference indicate like parts throughout, 10 generally indicates a tumbling unit for use in carrying out the first step of my improved method, which method is diagrammatically illustrated in Figs. 5–8. Said improved method particularly relates to improvements in compression molding which comprise, inserting a plasticizable material in pulverant or pellet form within a mold die and lowering a cooperating mold punch within said mold die leaving a space between the punch and die for the formation of the article and retaining the punch within the die under suitable conditions of heat and pressure to plasticize the article. While my invention may be employed for molding any desired plasticizable material, it is particularly adapted for molding materials in hard form when plasticized, such as synthetic resins of the condensation product type, such as phenol formaldehyde condensation products known under "Bakelite" or "Durez" and other trade names and urea formaldehyde condensation products known under "Beetle" and "Plaskon" and other trade names and cellulose derivatives in the nature of cellulose acetate.

It is apparent, however, that my invention may be employed for thermoplasticizing any desired hard article, whether or not an actual chemical reaction takes place, as in thermosetting synthetic resins but I have found my invention particularly adapted for use with materials of the thermosetting type.

As shown in Fig. 5, I preferably preheat the plasticizable material 12 in pulverant or pellet form for a sufficient period of time to bring it substantially to semi-plastic condition, in the case of formaldehyde condensation products, up to substantially 150° F., while continuously agitating the same, preferably specifically by displacing and rapidly tumbling the same in at least two directions. I then, as shown in Fig. 6, insert said preheated material in a mold die 16 while at substantially said temperature or condition, close the mold by lowering the punch 14 within the mold die 16 and then plasticize said material, as shown in Fig. 7, by compressing said punch 14 within said die under suitable conditions of temperature and pressure. When formaldehyde condensation products are employed, I employ a line pressure of 1500 to 3500 pounds per square inch and cause the actual thermosetting to take place at 300–350° F. As shown in Fig. 8 after the material has been treated under suitable conditions of temperature and heat, the material becomes thermoset, or thermoplasticized to form a solid article 18 shown therein. Employing my improved method, in the case of formaldehyde condensation products with compression molding, I have found that the time of closing the mold is usually shortened between 15 to 30 seconds, depending upon the nature of the articles plasticized and the actual molding or thermosetting time decreased from 1 to 3 minutes, the closing time being shortened 15% to 35% of the time thought necessary if my initial step of preheating and of agitating the material be not employed and the molding or thermosetting time being shortened 15% to 50% of the time formerly thought necessary if my preheating and agitating step be not employed. Thus, while for most articles, the closing time formerly thought necessary varied from 1 to 3 minutes, employing my invention, it may be cut down to between 15 to 35 seconds and the thermosetting, or molding time formerly thought necessary which varied between 4 to 7 minutes may be cut down, employing my preheating and agitating step to between 2 to 5 minutes. The time intervals necessary for these two steps, whether or not my invention be employed, vary in accordance with the nature and size of the article being molded.

I have shown in Figs. 1–5 views of an improved preheater I may employ for preheating the plasticizable material 12, whether it be in pellet or pulverant form to shorten the time of molding thereof. Said preheater includes a hollow container 20 of generally cylindrical shape having a closed end 22 and an open end 24, an inner side wall 26 and an outer side wall 28 forming a hollow annular heat-insulating chamber 30 between them. Said container is adapted to be mounted on a surface at an oblique angle thereto, preferably with the open end 24 uppermost. I provide a rotatable cylinder 32 of less diameter than said container inner wall 26 and also having a closed end 34 rotatably mounted within said container 20 at a spaced radial distance from said container inner wall 26 and preferably at a spaced axial distance from the closed end wall 22 of said container 20 forming an annular radial air insulating space 36 between the inner wall 26 and cylinder 32 and an axial air insulating space 38 between said closed container end wall 22 and closed end wall 34 of said rotatable cylinder. To receive the actual plasticizable material 12 in pulverant or pellet form, I provide a hollow heating cylinder 40 of less diameter than said rotatable holding cylinder 32 removably contained therein also having a closed end 42 and a hollow open end 44 and I provide a removable cap 46 for the hollow end 44 of the heating cylinder 40. Any suitable means may be provided for rotating the rotatable cylinder 32 and enclosed heating cylinder 40. Any suitable means may be provided for heating the device, but I preferably employ a heating means air insulated from the actual container, so as to more accurately control the temperature of the material to be plasticized. I referably employ an indirect heating system and while any suitable type of heating means may be inserted in the heating chamber 30, electric, flammable, or otherwise, in order that the temperature may be more accurately controlled, I preferably employ indirect steam as my heating medium, which may be introduced into said heating chamber 30 by the steam inlet pipe 48 and discharged therefrom by the steam outlet pipe 50 at a spaced distance therefrom. The container 20 is preferably heat insulated by suitable heat insulating material.

Further refinements of the actual structure of the container 20 I preferably employ will now be described. The removable cap is preferably provided with a suitable handle 52. The holding cylinder 40 is preferably mounted in the rotatable cylinder 32 at a spaced distance therefrom to provide additional heat insulating space 54 therebetween and for this purpose, in my improved embodiment, I provide on the exterior surface of the holding cylinder 40, a plurality of circumferentially spaced axially extending fins 56 adapted to abut the inner wall of the rotatable cylinder 32 to evenly maintain said heating cylinder 40 within the holding cylinder 32 at a spaced distance therefrom and of a nature to readily permit the axial removal of the heating cylinder 40 from the rotatable cylinder 32. In the embodiment shown, the layer of heat insulation material 58 is preferably applied on the outer wall 28 of the container 20 and the annular portion 60 of the open end 24 thereof exterior of the central hole 24 thereof as at 64. In the embodiment shown, the closed end 22 of the container 20 is preferably provided with the annular lip 66 projecting radially outwardly from the closed end thereof. To provide the closed end 22 of said container, I preferably provide a circular plate 22 and a circular layer of heat insulating material 68, which are laid over said closed end and secured to said annular lip 66, in the embodiment shown, by means of a plurality of bolts 70 extending through holes spaced circumferentially of the outer end of said plate 22 and insulating layer 68 and lip 66.

The rotatable cylinder 32 may be suitably supported to rotate within the container 20 in any suitable fashion. In my preferred embodiment, however, for this purpose a shaft 72 projects axially from the closed end 34 of said rotatable cylinder 32 through a suitable bearing hole 74 formed in the closed end 22 of said container and to support the open end of said rotatable cylinder within the open end of the container, the rotatable cylinder 34 is provided near its open end with an annular flange 76 projecting radially from the hollow open end thereof to provide a bearing for rotatably supporting said rotatable cylinder against the inner wall 26 of said container. If desired the closed end may be provided with an enlarged internal boss 78 to provide a bearing hole 74 of the desired thickness for the closed end of said container. The shaft 72 may be rotated by any suitable means.

As stated, however, I preferably provide a self-contained unit which may be moved about the molding plant as desired and for this purpose I provide a base 80 of a size to be readily moved about the factory, such as 2' x 4'. The container 20 may be suitably mounted on said base, as by means of U-shaped supporting bars 82 and 84. In the embodiment shown, the U-bar 82 is preferably of a greater height than the U-bar 84, so as to support said container axially of said base at an oblique angle thereto. It is obvious that the positions of the angle bars 82 and 84 may be reversed so as to change the angular obliquity at which the container 20 is mounted on the base 80, from a position mounting said container 20 on said base 80 with the open end 24 thereof uppermost to a position with the closed end 22 uppermost. Insofar as carrying out my improved method on this apparatus is concerned, it is immaterial which end is uppermost, for as a rotative movement is imparted to the heating cylinder 40, the particles will be displaced and tumbled in a radial direction and due to the oblique angle mounting of the container 20 on the base 80, it is also apparent that they will be displaced and tumbled in an axial direction. However, as it is slightly more convenient to have the open end 24 uppermost for removing the heating cylinder 40 from the container 20, I preferably so mount the container 20 on the base 80 that said open end 24 will be uppermost in the manner shown. While any suitable means may be provided to rotate the cylinder 40, or to rotate the shaft 72, for this purpose, I preferably provide the motor 83 mounted on a suitable pedestal 85 on one end of the base 80 to have the rotor thereof extend in a direction radial of said shaft 72. A suitable electric conduit 86 and plug 87 is provided for detachably connecting the motor 83 to any adjacent electric light socket. While any suitable means may be employed for rotating the cylinder 40 from the motor 82, in the embodiment shown, I preferably provide a worm 88 on the end of the rotor shaft 90 meshing with a suitable worm gear 92 on the end of the shaft 72.

Figure 2:
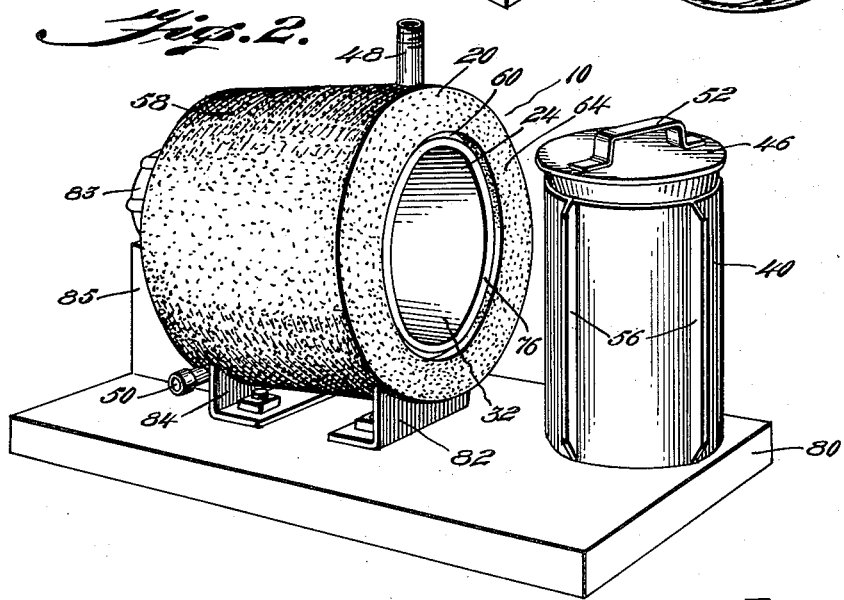
Fig. 2 is a perspective view of the same taken from the opposite end thereof and with the heating cylinder removed.

In practice, the heating cylinder 40 may be conveniently removed from the container 20, as shown in Fig. 2, the cover 46 may be removed therefrom and the desired amount of plasticizable material in powder or pellet form inserted in the cylinder 40. It will be observed that in order to get free axial displacement as well as radial displacement of the powder or pellets of plasticizable material, that the container is only partially filled. The motor 83 is then turned on and steam circulated through the heating chamber 30 for a sufficient period of time to bring the material to a semi-plastic condition, in the embodiment where formaldehyde condensation products are used, substantially up to 150° F., this requiring the average time of about four minutes. It is obvious that the temperature can readily be controlled to bring it up to the desired temperature by means of the heat insulating air spaces 30, 36 and 54 hitherto described. The cylinder 40 may then be removed and the material 12 in substantially semi-plastic condition may be removed from the heating cylinder 40 into the mold die 16 by pouring it in or by means of a suitable scoop 94. The molding then takes place in the manner hitherto described. Due to the preheating of the plasticizable material, it its apparent that substantially all the gas will be burned off from the powder prior to insertion in the mold, thereby eliminating ebulition in both the mold closing and setting steps and consequent ebulition of plasticizable material and flash, cutting down the time of mold closing and time of thermosetting, substantially eliminating blistering, and providing a better plasticized product, in the manners hitherto described.

It is understood that my invention is not limited to the specific embodiment shown or methods described and that various deviations may be made therefrom without departing from the spirit and scope of the appended claims.

What I claim is:

1. A method of preheating plasticizable thermosetting molding material in pulverant or pellet form immediately preparatory to molding the same which comprises tumbling said material in at least two directions within an inclined cylindrical container surrounded by a heating medium at a temperature sufficiently high to heat said material to a semi-plastic condition.

2. A method of preheating plasticizable thermosetting molding material in pulverant or pellet form immediately preparatory to molding the same which comprises tumbling said material axially and radially within an inclined cylindrical container surrounded by a heating medium at a temperature sufficiently high to heat said material to a semi-plastic condition.

KNUT E. BIRGER STENBERG.